(12) United States Patent
Kraus et al.

(10) Patent No.: US 12,398,879 B2
(45) Date of Patent: Aug. 26, 2025

(54) PROCESSES AND APPARATUSES FOR BURNING A HYDROGEN FUEL AND A HYDROCARBON FUEL

(71) Applicant: UOP LLC, Des Plaines, IL (US)

(72) Inventors: Kurt E. Kraus, Tulsa, OK (US); Carl J. Stevens, Deerfield, IL (US); Jeffrey J. Guenther, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 433 days.

(21) Appl. No.: 18/153,778

(22) Filed: Jan. 12, 2023

(65) Prior Publication Data

US 2023/0288058 A1     Sep. 14, 2023

Related U.S. Application Data (60) Provisional application No. 63/269,172, filed on Mar. 10, 2022.

(51) Int. Cl.
| | |
|---|---|
| *F23C 6/02* | (2006.01) |
| *F23C 6/04* | (2006.01) |
| *F23C 7/00* | (2006.01) |
| *F23C 9/06* | (2006.01) |
| *G06Q 30/018* | (2023.01) |

(52) U.S. Cl.
CPC ............... *F23C 6/02* (2013.01); *F23C 6/045* (2013.01); *F23C 7/008* (2013.01); *F23C 9/06* (2013.01); *G06Q 30/018* (2013.01); *F23C 2202/10* (2013.01); *F23C 2700/04* (2013.01); *F23C 2900/03004* (2013.01); *G06Q 2220/00* (2013.01)

(58) Field of Classification Search
None
See application file for complete search history.

(56) References Cited

U.S. PATENT DOCUMENTS

| | | | |
|---|---|---|---|
| 4,505,666 | A | 3/1985 | Martin et al. |
| 5,073,105 | A | 12/1991 | Martin et al. |
| 6,875,008 | B1 | 4/2005 | Martin et al. |
| 6,893,251 | B2 | 5/2005 | Stephens |
| 7,950,919 | B2 | 5/2011 | Johnson et al. |
| 10,690,339 | B2 | 6/2020 | Martin et al. |
| 2004/0101796 | A1 | 5/2004 | Hilton et al. |
| 2008/0078122 | A1 | 4/2008 | Clark |
| 2011/0226010 | A1 | 9/2011 | Baxter |
| 2013/0104563 | A1 | 5/2013 | Oelfke et al. |

(Continued)

FOREIGN PATENT DOCUMENTS

| | | |
|---|---|---|
| CN | 210740397 U | 6/2020 |
| WO | 2021205011 A1 | 10/2021 |
| WO | 2022006442 A2 | 1/2022 |

OTHER PUBLICATIONS

International Search Report from PCT application No. PCT/US2023/064039, mailed Jul. 7, 2023.

(Continued)

*Primary Examiner* — Ko-Wei Lin (57) ABSTRACT

Processes and apparatuses for heating process fluid in a furnace. Fuel to the furnace is either hydrocarbons or hydrogen. The fuels may be sent to different furnaces or be sent at different times to the same furnace. Furnaces that are configured to receive both types of fuels may have different exhaust paths. An exhaust path for hydrocarbon fuel flue gas includes a carbon capture process zone.

14 Claims, 4 Drawing Sheets

(56) References Cited

U.S. PATENT DOCUMENTS

| | | |
|---|---|---|
| 2014/0186257 A1 | 7/2014 | Jadhav |
| 2018/0016979 A1 | 1/2018 | Palmer et al. |
| 2020/0063662 A1 | 2/2020 | Takaki et al. |
| 2020/0325087 A1 | 10/2020 | Mostofi-Ashtiani et al. |
| 2020/0386404 A1 | 12/2020 | Kraus et al. |
| 2021/0009904 A1 | 1/2021 | Frey et al. |
| 2021/0095599 A1 | 4/2021 | Asai et al. |

OTHER PUBLICATIONS

Written Opinion from PCT application No. PCT/US2023/064039, mailed Jul. 7, 2023.

International Search Report from corresponding PCT application No. PCT/US2023/064045, mailed Jul. 10, 2023.

Written Opinion from PCT application No. PCT/US2023/064045, mailed Jul. 10, 2023.

De Ren, Jan et al., A Paradigm Shift in Steam Assisted Elevated Flare Systems, Journal of the International Flame Research Foundation, Article No. 201619, Jul. 2020, ISSN: 2075-3071.

Nitrogen Oxides (NOx), Why and How They are Controlled, EPA Technical Bulletin, Nov. 1999 (available at: https://nepis.epa.gov/Exe/ZyPDF.cgi/2000F9IK.PDF?Dockey=2000F9IK.PDF).

API Recommended Practice 535, Burners for Fired Heaters in General Refinery Services, Third Edition, May 2014 (abstract and TOC only).

Wolschlag, Lisa M. et al., UOP FCC Design Advancements to Reduce Energy Consumption and CO2 Emissions, 2009, UOP LLC.

U.S. Appl. No. 18/062,767, filed Dec. 7, 2022 entitled "Low NOx Burner with Cooled Flue Gas Recycle".

U.S. Appl. No. 17/451,932, filed Oct. 22, 2021 entitled "Active and Passive Combustion Stabilization for Burners for Highly and Rapidly Varying Fuel Gas Compositions".

U.S. Appl. No. 17/451,933, filed Oct. 22, 2021 entitled "Lox NOx Burner with Bypass Conduit".

PROCESSES AND APPARATUSES FOR BURNING A HYDROGEN FUEL AND A HYDROCARBON FUEL

RELATED APPLICATIONS

This application claims priority to U.S. Provisional Patent Application Ser. No. 63/269,172 filed on Mar. 10, 2022, the entirety of which is incorporated herein by reference.

FIELD OF THE INVENTION

This invention relates generally to processes and apparatuses for burning a hydrogen fuel and a hydrocarbon fuel, and more particularly to furnaces used in plants to heat process fluid.

BACKGROUND OF THE INVENTION

Many problems might arise when an integrated petrochemical complex, or even on a stand-alone petrochemical processing unit, where there is fired equipment being operated with pre- or post-combustion carbon capture and removal.

Pre-combustion carbon removal usually means the combustion equipment (furnaces, heaters, boilers) is firing a low- or non-carbon containing fuel, often containing mostly hydrogen, but also possibly containing largely ammonia and lesser amounts of various gaseous hydrocarbons or inert gases such as carbon dioxide, nitrogen, water vapor, and the like.

Burners in the high-hydrogen fueled combustion system can be well designed to operate on fuels containing high levels of hydrogen. However, an area of potential concern exists because the mass flow of the resulting flue gas, products of combustion, from hydrogen firing can be around 20% less that those from hydrocarbon burners. If the heat transfer surfaces of the furnaces are designed for hydrogen firing, then they will not have sufficient capacity (flow area) to allow passage of and to transfer heat from the flue gas if fired on hydrocarbon fuels.

Another issue of potential concern from the combustion of high-hydrogen content fuels is the nitric oxide emissions in the flue gas can be as much as twice those of a hydrocarbon-fired furnaces.

For post-combustion carbon capture, where the furnaces are operated on largely hydrocarbon containing fuels such as natural gas, propane, LPG or synthesized gases such as refinery fuel gas or other off-gases, an issue of potential concern can be the capital and operating costs of post-combustion carbon capture equipment. Further, an operator may wish to switch between high hydrogen firing and high hydrocarbon firing due to changing regulatory, economic or process (feedstock) environments.

NOx emissions further become a concern as for hydrocarbon fire as well as hydrogen firing. If the subject process units are to be retrofit to new and different firing cases, the air permit may need to be updated to meet the latest NOx limitations, possibly triggering lower NOx limits and possibly requiring a selective catalytic reduction (SCR) processing zone.

Low NOx emissions also must be mitigated for some post-combustion carbon capture systems to reliably function. For example, Honeywell's Advanced Solvent Carbon Capture (ASCC) requires less than 25 ppm nitric oxide (NO) and low single-digit nitrogen dioxide ($NO_2$) content in the flue gas entering the ASCC processing zone. New burners have been invented (see, U.S. patent application Ser. Nos. 17/451,933, 63/170,139, and 63/266,306) are capable of delivering NOx emissions less than 25 ppmvd in steam cracking service, less than 20 ppmvd in steam methane reforming and less than 10 ppmvd typical refinery heater service. These levels not only facilitate the use with an ASCC processing unit, but also can eliminate the need for SCR in many cases. In cases where lower NOx is needed, the combustion system can be combined with an SCR are technically capable of achieving NOx levels less than 10 ppmvd in steam cracking service and less than 5 ppmvd in both steam methane reforming and typical refinery heater service. All values are corrected to 3% oxygen.

When electrically heating processes such as steam cracking, the subsequent downstream processing units will produce hydrogen that must either be exported or consumed by the process unit in a conventional steam cracker furnace, albeit one that fires only hydrogen and needs no further post-combustion firing. And those electric crackers will also need steam generated by boiling, either electrically or with gas combustion. Thus, the hydrogen generated by the electric steam cracker, post process furnace, can be used for steam generation in a conventional fired furnace or fired heater. As hydrogen sources such downstream steam cracker, SMR, electrolysis, or other sources are brought in and out of a give unit for firing, the loading of the hydrogen firing will need to flexibly change and adjust.

Many processes in a petrochemical or refining complex produce hydrogen gas as a primary product or as a co-product. These processes include but are not limited to steam cracking (gas fired or electric heated), steam methane reforming, catalytic cracking, propane dehydrogenization, methanol reforming or electrolysis.

Changing feedstocks can also change the hydrogen produced by a process unit. For example, gas crackers, such as ethane crackers, can produce much more hydrogen in downstream process unit as, say, liquid crackers, such as naphtha crackers. The change in feedstock change the economic balance of the olefins, hydrogen and other co-product to and from the process unit. An operator may choose to export more or less hydrogen for use or sale outside the process unit or fire more or less hydrogen in the furnaces. This poses a problem of which furnaces and which burners to direct the hydrogen, thereby changing the fuel gas composition to the burner and the mass flow rate through the furnace.

Accordingly, it would be desirable to have more effective and efficient ways to control burners that are able to accommodate not only both hydrogen fuels and hydrocarbon fuels, but to accommodate the fluctuation in the production of both.

SUMMARY OF THE INVENTION

One or more processes and apparatus have been invented which not only accommodate both hydrogen fuels and hydrocarbon fuels, but also accommodate the fluctuation in the production of both. This present disclosure provides a cost-effective way of turning hydrogen produced by a petrochemical process into blue, or fossil fuel hydrocarbon derived, hydrogen.

Currently, operating companies, are trying to achieve Scope 1 net zero greenhouse gases on petrochemical processing equipment, much of which is gas fired, currently mainly with gases largely containing hydrocarbons and producing significant greenhouse gas emissions. See, https://www.epa.gov/climateleadership/scope-1-and-scope-2-inventory-guidance. This invention flexibly responds to changing economic and regulatory requirements by delivering consistent, efficient fuel consumption, delivering heat to processes, with very low NOx emissions, with NOx emissions that are consistent across fuel sources of highly varying compositions. By being so flexible, this invention allows operation companies to achieve their Scope 1 greenhouse gas reduction targets.

Withdrawing flue gas from the combustion chamber allows for low NOx burner performance, while not loading up the convection section with additional flue gas as withdrawing from the stack. This mode of operation is best suited for hydrocarbon fuel firing as this has the greatest flue gas mass and volume flow rate for a given firing rate. The radiant and convection sections of the heater can be designed for these rates.

However, when post-combustion ASCC is applied, it is helpful to have higher concentrations of carbon dioxide in the flue gas. This helps the ASCC process work efficiently, but also minimizes capital and operating cost as the ASCC can be designed, built and applied only to the stacks that are firing hydrocarbon fuels. Other furnaces would be firing high hydrogen content fuel and would require no post-combustion carbon capture. These high-hydrogen or 100% hydrogen-fueled furnaces would withdraw flue gas from the stack, downstream of the convection section to increase the flue gas mass and volume flow rates to replace and equal that of the hydrocarbon fueled burners used for convection section capacity design or meet that rate which the process requires for optimal performance.

Alternatively, these steam or other convection section heated process fluids can be imported from a separate source such as a separate steam methane reformer. The additional steam and convection section loading can also be achieved by running the unit at higher excess air. Typical steam crackers are operated with about 10% excess air or roughly 2% stack oxygen. When largely hydrogen fuel burners are operated from roughly 20% to 40% excess air (depending on specific fuels being replaced from the original convection section-sizing design case), the mass flow can match that of the hydrocarbon fueled burners. However, running this high excess air is inefficient and often requires more fuel gas to achieve process heating. Also, the NOx emissions can be at least twice that of normal, low oxygen level (10% excess air) firing.

The hydrogen can come from the fired unit process equipment. For example, a steam cracker process unit produces hydrogen. This hydrogen can be returned to the steam cracker as fuel or exported for use in other processes or sold as a product gas. Alternatively, hydrogen can be sourced from an SMR, along with the steam, an auto thermal reformer (likely would not come with steam), and hydrogen electrolyzer (again no steam), or from downstream of an electric heated steam cracker (again, import steam required).

As would be appreciated, since the fuel and steam balance, i.e., the energy balance, can change depending on the fuel gas rate and composition supplied to the furnaces, which can be dependent on the directed use of the hydrogen produced in the unit (whether directed back to the furnace or exported) and the sources of the hydrogen and steam.

Therefore, the present invention may be characterized, in at least one aspect, as providing a process for controlling emissions in a plant by: passing a first fuel to a first furnace, the first furnace having a burner configured to receive combustion air, inject the first fuel and the combustion air into the first furnace, and produce a flame and flue gas; heating a first fluid in the first furnace; passing a second fuel to a second furnace, the second furnace having a burner configured to receive combustion air, inject the second fuel and the combustion air into the second furnace, and produce a flame and flue gas; heating a second fluid in the second furnace; wherein one of the first fuel and the second fuel comprises a hydrogen stream, and wherein the other of the first fuel and the second fuel comprises a hydrocarbon stream, wherein the first and second fuels are segregated from each other.

The present invention may also be characterized broadly as providing a process for controlling emissions from a furnace in a plant, in which the furnace is configured to receive a hydrogen fuel and a hydrocarbon fuel, to produce a flame and a flue gas, and to heat a process fluid in tubes extending within the furnace, and in which the process includes: determining a fuel being passed to the furnace, wherein the fuel comprises either a hydrogen fuel or a hydrocarbon fuel; providing a first exhaust path for a flue gas from the furnace when the fuel has been determined to be hydrogen fuel; and, providing a second exhaust path for a flue gas from the furnace when the fuel has been determined to be hydrocarbon fuel, wherein the first exhaust path and the second exhaust path are different.

The present invention may also be generally characterized as providing an apparatus having: a first furnace configured to receive a first fuel, the first furnace having a burner configured to inject the first fuel into the first furnace and produce a flame and a flue gas; and, a second furnace configured to receive a second fuel, the second furnace having a burner configured to inject the second fuel into the second furnace and produce a flame and a flue gas, wherein both of the first furnace and the second furnace are configured to receive a fluid to be heated, wherein one of the first fuel and the second fuel comprises a hydrogen stream, and, wherein the other of the first fuel and the second fuel comprises a hydrocarbon stream, and, wherein the first and second fuels are segregated from each other.

The present invention may also be further characterized generally as providing a furnace having: a first inlet configured to receive a first fuel, the first fuel comprising one of a hydrogen fuel and a hydrocarbon fuel; a second inlet configured to receive a second fuel, the second fuel comprising the other of the hydrogen fuel and the hydrocarbon fuel; a third inlet configured to receive combustion air; a burner configured to receive the combustion air, the first fuel, and the second fuel and inject the combustion air, the first fuel, and the second fuel into the furnace and provide a flame and a flue gas; a tube configured to contain process fluid to be heated in the furnace; a first exhaust path for the flue gas produced by in furnace, wherein the first exhaust path comprises a carbon capture process zone; a second exhaust path for the flue gas produced by in furnace; and, means for controlling a gas flow configured to change orientation so that when the first inlet is opened, only the first exhaust path is opened and when the second inlet is opened, only the second exhaust path is opened.

The present invention may also be generally characterized as providing a process for controlling coke on tubes in a furnace, in which the furnace has a burner configured to receive a fuel and combustion air and produce a flame to process fluid within the tubes, and in which the process includes: passing a first fuel and combustion air to a burner in a furnace; producing a flame from the combustion of the first fuel and heating a process fluid in process tubes within the furnace; determining a level of coke on the process tubes; when the determined level of coke meets or exceeds a threshold, passing a second fuel and combustion air to the burner in the furnace; and, producing a flame from the combustion of the second fuel and heating the process fluid in the process tubes within the furnace, wherein one of the first fuel and the second fuel comprises a hydrogen stream, and wherein the other of the first fuel and the second fuel comprises a hydrocarbon stream.

Further, the present invention may also be characterized as providing a process for generating carbon credits by: passing a first fuel to a first furnace, the first furnace having a burner configured to receive combustion air, inject the first fuel and the combustion air into the first furnace, and produce a flame and flue gas, wherein the first fuel comprises a hydrocarbon stream, wherein at least a portion of the hydrocarbon stream comprises hydrocarbons produced from a biobased feedstock; heating a first fluid in the first furnace; passing a second fuel to a second furnace, the second furnace having a burner configured to receive combustion air, inject the second fuel and the combustion air into the second furnace, and produce a flame and flue gas, wherein the second fuel comprises a hydrogen stream; heating a second fluid in the second furnace; recovering carbon compounds from the flue gas from the first furnace; and, determining an amount of carbon compounds attributable to the hydrocarbons produced from a biobased feedstock so as to generate a carbon credit.

Additional aspects, embodiments, and details of the invention, all of which may be combinable in any manner, are set forth in the following detailed description of the invention.

BRIEF DESCRIPTION OF THE DRAWINGS

One or more exemplary embodiments of the present invention will be described below in conjunction with the following drawing figures, in which.

DETAILED DESCRIPTION

As mentioned above, a processes and apparatus have been invented which not only accommodate both hydrogen fuels and hydrocarbon fuels, but also accommodate the fluctuation in the production and consumption of both. Accordingly, the present disclosure describes the switching and selecting furnaces based on the type of fuel. Additionally, the present describes the selecting and determining a flue gas source to reduce NOx production and possibly eliminate the need for an SCR unit. Finally, the present disclosure allows for more economical carbon capture by reducing the size of the processing units needed to capture carbon from hydrocarbon fuels after combustion.

With these general principles in mind, one or more embodiments of the present invention will be described with the understanding that the following description is not intended to be limiting.

Figure 1:
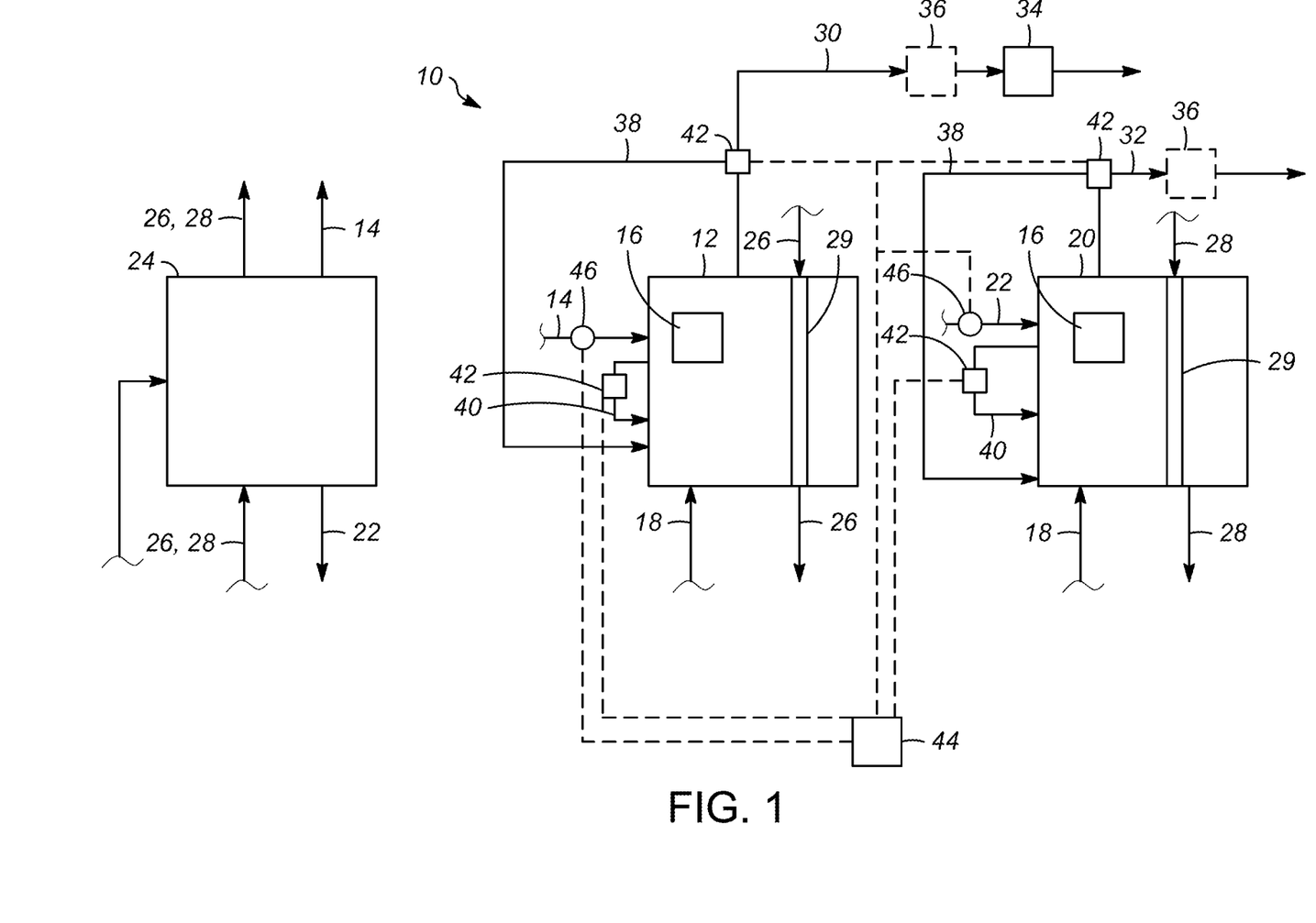
FIG. 1 is a schematic diagram of an apparatus according to one or more embodiments of the present disclosure.

As shown in FIG. 1, an apparatus 10 according to various aspects of the present disclosure includes a first furnace 12 configured to receive a first fuel 14. The first furnace 12 includes a burner 16. As is known, the burner 16 is configured to inject the first fuel 14 and a combustion air 18 into the first furnace 12 and produce a flame.

Exemplary burners 16 are disclosed in U.S. Pat. Nos. 5,073,105 and 6,875,008. These burners 16 may utilize internally recycled flue gas to modulate emissions from the burner. More recently, burners that use externally recycled flue gas have been disclosed. See, U.S. patent application Ser. Nos. 17/451,933, 63/170,139, and 63/266,306.

Returning to FIG. 1, the apparatus 10 also includes a second furnace 20 configured to receive a second fuel 22. The second furnace 20 also includes a burner 16. The burner 16 in the second furnace injects the second fuel 22 and a combustion air 18 into the second furnace 20 and produces a flame. The burner 16 in the second furnace 20 can be the same or different as the burner 16 in the first furnace 12.

Typically, the first and second furnaces 12, 20 are associated with a chemical processing plant 24. Example chemical processing plants 24 include steam cracking (gas fired or electric heated), steam methane reforming, catalytic cracking, propane dehydrogenization, methanol reforming or electrolysis. Accordingly, the first and second furnaces 12, 20 each also receives a process fluid 26, 28 that is used in one or more processes in the chemical processing plants 24. The process fluids 26, 28 are heated in process tubes 29 that are within the respective furnaces 12, 20. The process fluids 26, 28 may be the same or different.

According to the present disclosure, one of the first fuel 14 and the second fuel 22 is a hydrocarbon stream. The other of the first fuel 14 and the second fuel 22 is a hydrogen stream. In current designs, these two fuel streams 14, 22 are often frequently blended together and sent to the same furnaces as fuel to be combusted. However, in various aspects of the present disclosure, these two fuels 14, 22 are segregated from each other. Accordingly, by "segregated" it is intended to mean that 85% of the hydrogen stream is hydrogen. Thus, this stream may include small or trace amounts of hydrocarbons. This stream may also be further purified by processes such as pressure swing absorption to contain a higher concentration of hydrogen, even highly purified hydrogen. Similarly, 85% of the hydrocarbon stream is hydrocarbons, and it can include trace hydrogen. Additionally, as will be described elsewhere, the present disclosure provides the ability to change the fuel within a single furnace (i.e., change from hydrogen fuel to hydrocarbon fuel). Thus, it is contemplated that while switching between the types of fuels, these amounts may temporarily fluctuate. However, the furnace is operated under conditions so that it is using or will be using (once the change is completed) either a hydrogen or a hydrocarbon fuel.

None, one, or both of the hydrogen stream 14 and the hydrocarbon stream 22 may be produced at the plant 24. Additionally, like streams 14, 22 may be combined with like streams. For example, a hydrocarbon stream produced at the plant 24 may be combined with another hydrocarbon stream (either produced at the plant 24 or elsewhere). Similarly, a hydrogen stream produced at the plant 24 may be combined with another hydrogen stream (either produced at the plant 24 or elsewhere).

The apparatus 10 also includes a first exhaust path 30 for flue gas from the first furnace 12 and a second exhaust path 32 for flue gas from the second furnace 20. The two exhaust paths 30, 32 are different and the exhaust path 30, 32 will depend on the type of fuel.

For example, when the first fuel 14 is hydrocarbon fuel, the first exhaust path 30 may include a carbon capture process zone 34. The carbon capture process zone 34 may utilize solvents, solid sorbents, membranes, or cryogenic separation. Currently, available solvent carbon capture process zones 34 include CANSOLV, KMCDR Process (KS-1

Solvent), OASE Advanced Carbon Capture Just Catch, Big Catch, CDRMax, Econamine, DMX, and Advanced Solvent Carbon Capture (ASCC) available from Honeywell/UOP. From the carbon capture process zone 34, the first exhaust path 30 may vent to the atmosphere.

The second exhaust path 32, for use with the hydrogen fuel as the second fuel 22, may be vented directly to the atmosphere. By "directly" it is meant that there is no carbon capture process zone 34 on the second exhaust path 32. It is contemplated that the flue gas in the second exhaust path 32 may still be processed to remove other contaminants. For example, none, one, or both of the first and second exhaust paths 30, 32 may include an SCR process zone 36 to address NOx gases. As is known, the SCR process zone 36 uses selective catalytic reduction (SCR) to removes nitrogen oxides (NOx) from the flue gas.

Additionally, or alternatively, the apparatus 10 may include conduits, ducts or other similar devices 38, 40 which externally recirculate a portion of the flue gas from the furnaces 12, 20 back to the respective furnaces 12, 20 to reduce NOx production.

Therefore, means 42 for controlling a gas flow may be provided to direct a flow of the flue gas. The means 42 for controlling a gas flow may includes valves, like a control valve, as well as turbines, baffles, dampers, fans, pumps, or the like. As has recently been disclosed, by using eternally recycled or recirculated flue gas, the NOx produced at the burner may be reduced. The use of the eternally recycled or recirculated flue gas may eliminate the need for the SCR process zone 36.

A controller 44 may be provided and be in communication (wired or wireless) with one or both means 42 for controlling a gas flow. The controller, or a computing device, includes a processing unit or processor and a memory which has stored therein computer-executable instructions for implementing the processes described herein. The processor may comprise any suitable devices configured to cause a series of steps to be performed so as to implement the method such that instructions, when executed by the computing device or other programmable apparatus, may cause the functions/acts/steps specified in the methods described herein to be executed. The processing unit may be, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Returning to FIG. 1, the controller 44 may be configured to send a signal to selectively change the orientation of each means 42 for controlling a gas flow. In a first orientation or configuration, the means 42 for controlling a gas flow may prevent flue gas flow in a first direction and allow flow in a second direction, while in a second orientation or configuration the means 42 for controlling a gas flow may allow flow in the second direction and prevent flow in a third direction. Similarly, in orientation or configuration the means 42 for controlling a gas flow may allow a first flow rate, while in a second orientation or configuration the means 42 for controlling a gas flow may allow a second flow rate that is greater than or less then the first flow rate.

The controller 44 may be in communication with one or more sensors 46 which are be configured to obtain data to determine whether the first fuel 14 is the hydrocarbon stream or the hydrogen stream and whether the second fuel 22 is the hydrocarbon stream or the hydrogen stream. Accordingly, the controller 44 may be further configured to send a signal to change the orientation of each means 42 for controlling the gas flow based on determining whether the first fuel 14 is the hydrocarbon stream or the hydrogen stream and whether the second fuel 22 is the hydrocarbon stream or the hydrogen stream.

Figure 2:
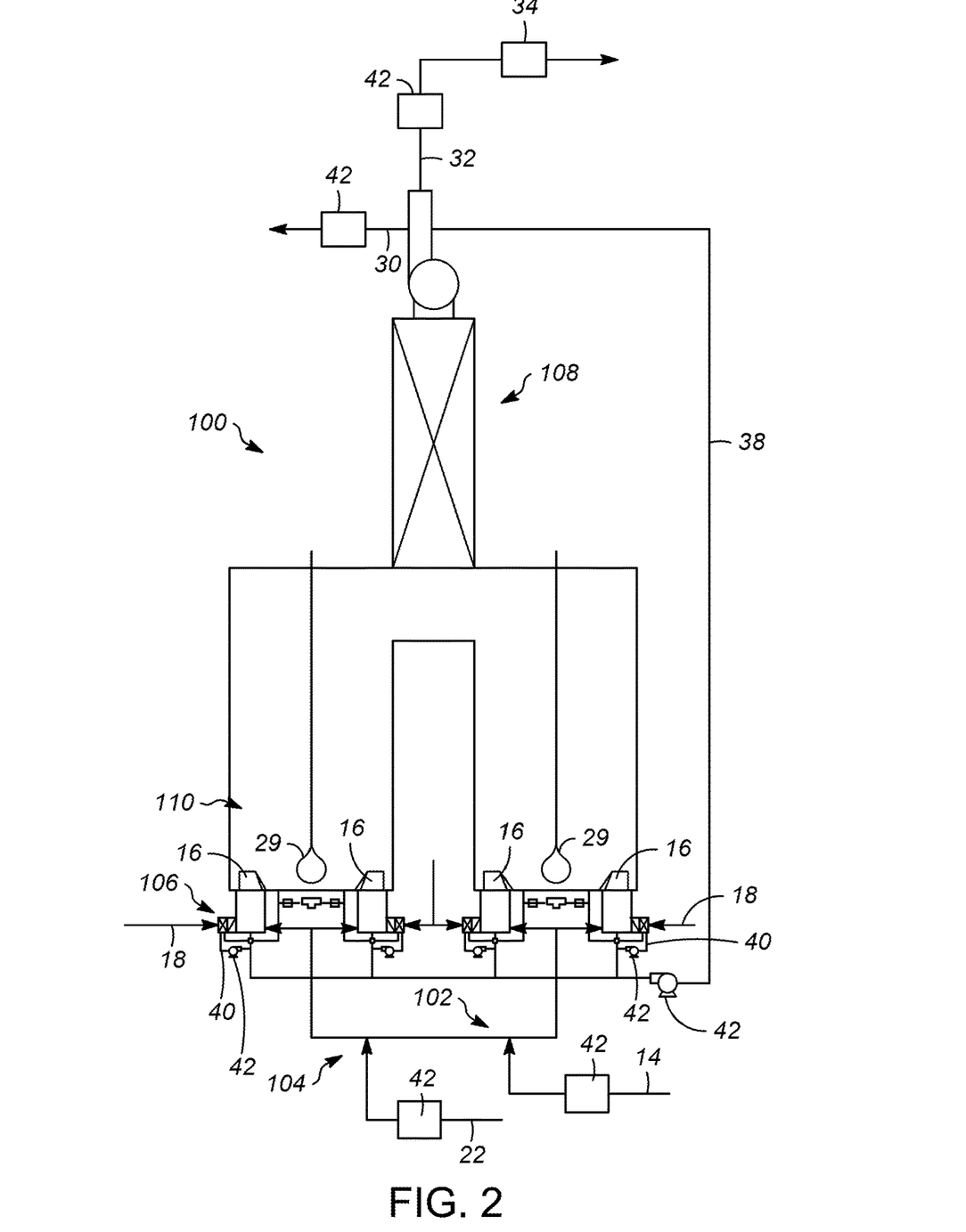
FIG. 2 is a schematic diagram of a furnace according to one or more embodiments of the present disclosure; and, FIG. 3 shows a plurality of the furnaces shown in FIG. 2.

Accordingly, turning to FIG. 2, a furnace 100, according to aspects of the present disclosure, may be configured to receive both the hydrogen and hydrocarbon fuels. In other words, the furnace 100 may be in selective communication with the first fuel 14 and the second fuel 22. However, as noted above and optimally, only one of the fuels 14, 22 will be primarily provided to the furnace 100 at any given time. One of ordinary skill in the art will appreciate that the furnace 100 can work sub-optimally with any proportion of the fuels 14,22 being directed to any furnace. Sub-optimally meaning those configured for the hydrogen fuel and direct venting to atmosphere will emit more CO2 to atmosphere and those configured for hydrocarbon fuel will push more exhaust through the carbon capture process zone 34 and thus, the carbon capture process zone 34 will need to be larger and may work less efficiently. In FIG. 2, the same reference numerals are used for the same features.

Thus, the furnace 100 includes burners 16 which, in addition to receiving the fuels 14, 22, receive the combustion air 18 and produce a flame within the furnace 100. The heat from the flame is used to heat the process fluid in the tubes 29.

The furnace 100 is associated with a first inlet 102 configured to receive the first fuel 14 and a second inlet 104 configured to receive the second fuel 22. Again, the first fuel 14 is either a hydrogen fuel and a hydrocarbon fuel and the second fuel 22 is the other of the hydrogen fuel and the hydrocarbon fuel. The inlets 102, 104 may be located some distance from the furnace 100 in a conduit or other pipe. The furnace 100 also includes a third inlet 106 for receiving combustion air. The depicted embodiment illustrates an induced-draft furnace configuration with fresh air inlet, however preheated air systems, enhanced oxygen, or depleted oxygen systems such as turbine exhaust gas can be contemplated.

The furnace 100 is also in communication with the first exhaust or outlet path 30 and the second exhaust or outlet path 32. As shown in FIG. 1, the first exhaust or outlet path 30 includes a carbon capture process zone 34.

The furnace includes various means 42 for controlling gas flow so that when the furnace 100 is using hydrocarbon fuel (in this example as the first fuel), the first inlet 102 is opened and the second inlet 104 is closed. By "opened" it is meant that the first fuel 14 can flow to the burner 16 and by "closed" it is meant that the second fuel 22 cannot flow to the burner 16. The first exhaust or outlet path 30 will also be opened and the second exhaust or outlet path 32 may be closed. When the furnace 100 is using hydrogen fuel (in this example as the second fuel 22), the second inlet 104 is opened, while the first inlet 102 is closed. Similarly, the second exhaust path 32 is opened while the first exhaust path 30 is closed. Although not required, the various means 42 for controlling gas flow may be in communication with the controller 44 (see, FIG. 1) which may be configured to signals to adjust an orientation of the means 42 for controlling gas flow depending on the type of fuel.

Additionally, when the furnace 100 is receiving the first fuel and the first fuel is a hydrocarbon fuel, flue gas may be removed from the above the convection section 108 via conduit 38 and recirculated to the burner 16. When the furnace 100 is receiving the second fuel 22 and the second fuel is a hydrogen fuel, flue gas may be removed from combustion zone 110 in the furnace 100 via conduit 40 and recirculated to the burner 16. This is merely preferred, and it should be appreciated that the flue gas may be taken from both locations irrespective of the type of fuel, and in fact the flue gas may be blended together. Also, it should be appreciated that the flue gas may be delivered directly to or adjacent to the burner 16.

Figure 3:
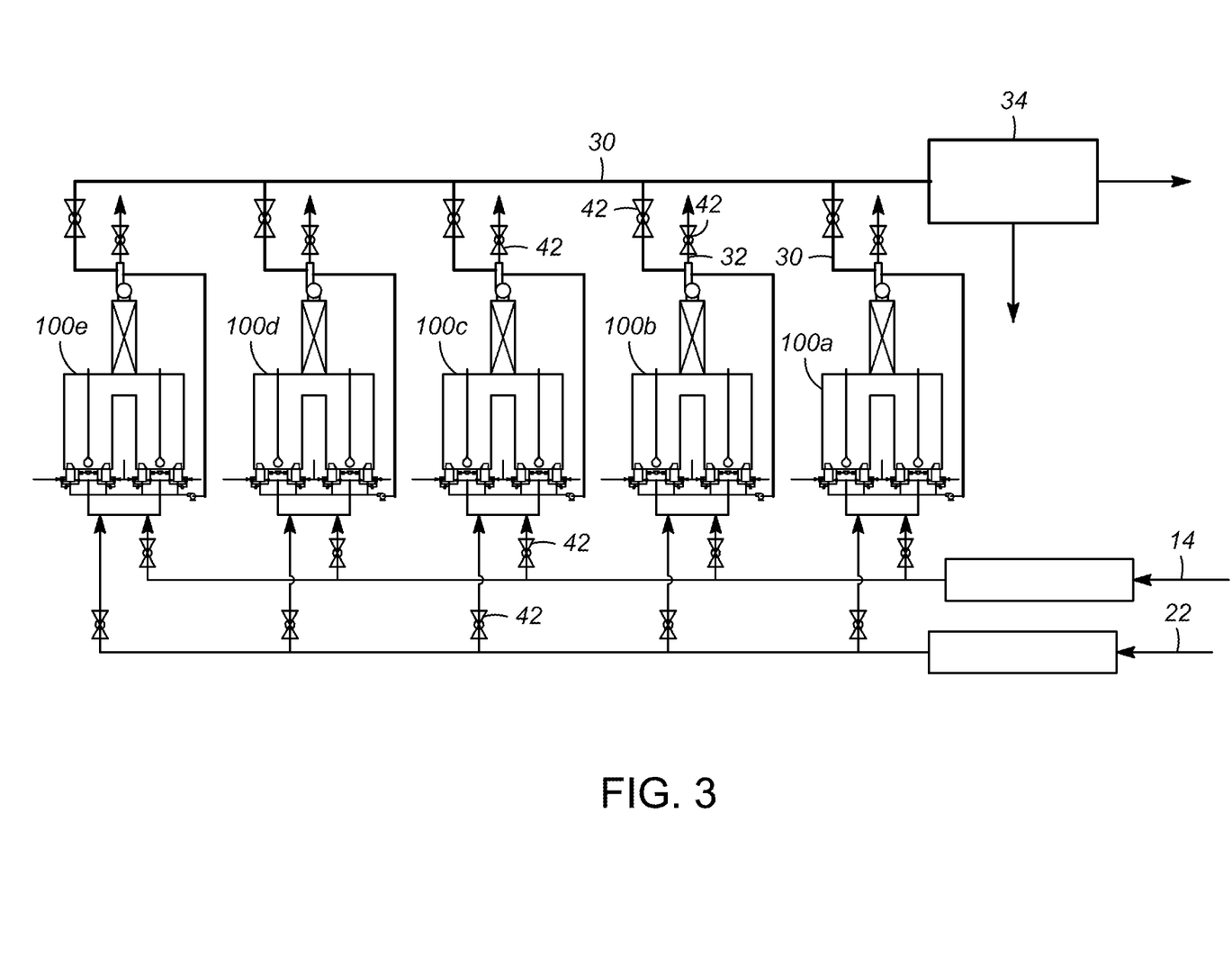

Thus, as shown in FIG. 3, a plurality of furnaces 100*a*, 100*b*, 100*c*, 100*d*, 100*e* are provided. The first furnace 100*a* may have the first inlet 102 opened and thus may be receiving the first fuel 14 which may be, for example, the hydrocarbon fuel. At the same time, the second furnace 100*b* has the second inlet 105 opened and thus may be receiving the second fuel 22 which is the hydrogen fuel. This allows both hydrogen fuel and hydrocarbon fuel to be consumed at the same time without completely blending them together.

As will be appreciated, any number of the furnaces 100*a*, 100*b*, 100*c*, 100*d*, 100*e* can be configured to consume hydrocarbon fuel, while the remaining furnaces 100*a*, 100*b*, 100*c*, 100*d*, 100*e* may be configured to consume hydrogen fuel. This ratio may change depending on the amount and/or availability of fuel. For example, at the start up operations, all of the furnaces 100*a*, 100*b*, 100*c*, 100*d*, 100*e* may be configured to process hydrocarbon fuel. Once the operations reach a certain point, one or more of the furnaces 100*a*, 100*b*, 100*c*, 100*d*, 100*e* may change configurations so that they can consume hydrogen fuel. It is further contemplated that at the start up, some furnaces 100*a*, 100*b*, 100*c*, 100*d*, 100*e* are configured to process hydrogen fuel, but they are not used until sufficient hydrogen is produced.

For example, for steam cracking or dehydrogenation processes, regardless of how the process is heated, hydrogen fueled flame, hydrocarbon fueled flame or even elect heated process tubes 29, coproducts of process will include relatively pure hydrogen and methane as well as the desired olefins. If electric process heating is used, both hydrogen and methane are produced. The hydrogen can be exported as a carbon free fuel source, or it can be used in heating the steam cracking or PDH process. Meanwhile, the methane produced may be most economically used for direct process heating, with post-combustion carbon capture, or exported to a reformer where the hydrogen is produced, and the resulting carbon captured or exported as a fuel source. If the later, exported as a fuel source, where there is no further carbon capture, such as directed to a pipeline as synthesized or blended with natural gas, then the end CO2 emissions from the methane's ultimate use, combustion may be seen as greenhouse gas production.

Accordingly, one economical scenario for electric heated steam cracking furnaces or PDH heaters may be for one or more of the furnaces or heaters to be electrically heated, then other furnaces to be hydrogen fired, and still other furnaces methane fired with solvent carbon capture leading to zero or very low CO2 emissions from a plurality of steam cracking furnaces and/or dehydrogenation heaters when electric heating utilized. Then depending on the economics of using hydrogen and methane internally vs exporting, the number of heaters using electric heating, hydrogen fuel or methane fuel with solvent carbon capture can be modulated.

The present disclosure also contemplates various processes which involve combusting hydrogen and/or hydrocarbon fuels. For example, the present disclosure contemplates processes for controlling carbon dioxide and/or NOx emissions from a plant 12.

Accordingly, such a process may include passing a first fuel 14 to a first furnace 12, the first furnace 12 having a burner 16 configured to receive combustion air 18. The burner 16 injects the first fuel 14 and the combustion air 18 into the first furnace 12 and produces a flame. As described above, a first process fluid 26 in the first furnace 12 is heated by the heat produced with the flame.

A second fuel 22 is passed to a second furnace 20 which has a burner 16 configured to receive combustion air 18. Again, the burner 16 in the second furnace 20 injects the second fuel 22 and the combustion air 18 into the second furnace 20 and produces a flame. A second process fluid 28 is heated in the second furnace 20. Although called the second process fluid 28, the first and second furnace 12, 20 may receive the same process fluid 26, 28.

One of the first fuel 14 and the second fuel 22 is a hydrocarbon steam that may or may not be produced at the plant 24. The other of the first fuel 14 and the second fuel 22 is a hydrogen stream that also may or may not be produced at the plant 24. The hydrogen stream may be green hydrogen, blue hydrogen, or grey hydrogen. Further, as described above, these fuel streams 14, 22 may be formed by combination of like with like streams. Again, unlike conventional processes in which the two types of fuel streams 14, 22 are combined, according to aspects of the present disclosure, these streams 14, 22 are primarily segregated and sent to different furnaces 12, 20. In other words, the first fuel 14 and the second fuel 22 are unblended relative to each other and may be passed to their respective furnaces 12, 20 at the same time, i.e., simultaneously.

This allows for the use of different flue exhaust paths 30, 32 depending on the type of fuel being passed to the respective furnace 12, 20. For example, when the first fuel 14 is the hydrocarbon stream, the process may include removing carbon from flue gas from the first furnace 12 in a carbon capture process zone 34. Additionally, the process may also include venting a flue gas from the second furnace 20 directly to the atmosphere without requiring carbon capture or other carbon reducing processing. As discussed above, other processing, like an SCR process zone 36 may be done, but no carbon capture is needed or used for the flue gas from the second furnace 20.

The process may include mixing flue gas from the first furnace 12 with the first fuel 14 before the first fuel produces the flame in the first furnace 12. The mixing can be done at the burner 16 or before the fuel/flue gas is passed to the burner 16. The flue gas may be removed from the first furnace 12 above a convection section 108 of the first furnace 12. Additionally, or alternatively, the flue gas may be removed from the first furnace 12 from a combustion zone/chamber 110 in the first furnace 12.

The present disclosure also provides a process for controlling emissions from a furnace 12, 20, 100, 100a, 100b, 100c, 100d, 100e in a plant 24. The furnace 100 is configured to receive a hydrogen fuel and a hydrocarbon fuel, to produce a flame, and to heat a process fluid 26, 28 in tubes 29 extending through the furnace 100.

Such a process may begin with determining a fuel being passed to the furnace 100, wherein the fuel comprises either a hydrogen fuel or a hydrocarbon fuel. This determination may, but is not required to, be made by a controller 44 receiving data or information from sensors 46. When the fuel has been determined to be hydrocarbon fuel, a first exhaust path 30 for flue gas from the furnace is provided, and when the fuel has been determined to be hydrogen fuel, a second exhaust path 32 is provided for flue gas from the furnace. The first exhaust path 30 and the second exhaust path 32 are different.

Providing the first exhaust path 30 may include changing an orientation of at least one means 42 for controlling a gas flow in order to direct flue gas to either the first exhaust path 30 or the second exhaust path 32.

The first exhaust path 30 may include a carbon capture process zone 34. The carbon capture process zone 34 may, as discussed above, utilize solvents, solid sorbents, membranes, or cryogenic separation.

Additionally, the first exhaust path 30 and/or the second exhaust path 32 may include an SCR process zone 36. If disposed in the first exhaust path 30, the SCR process zone 36 may be between the furnace 100 and the carbon capture process zone 34. If disposed on the second exhaust path 32, the SCR process zone 36 may be disposed between the furnace 100 and an opening to the atmosphere. The second exhaust path 32 may not include any carbon capture process zones between the furnace 100 and the opening to the atmosphere.

The present invention also provides processes for controlling coke on tubes 29 in a furnace 12, 20, 100, 100a, 100b, 100c, 100d, 100e. For furnaces that build carbon, coke up, inside the process tubes 29 and require periodic de-coking, it is very important and valuable to extend the de-coke cycle, the runtime between de-coking. Steam Cracking furnaces are an example of furnaces 12, 20, 100, 100a, 100b, 100c, 100d, 100e where de-coke cycle is very important, extending runtime is very valuable. Therefore, the heat flux curve, the relative heat flux imparted upon the process tubes 29 over the height or length of the process tube coil, is very important and often specified feature.

Figure 4:
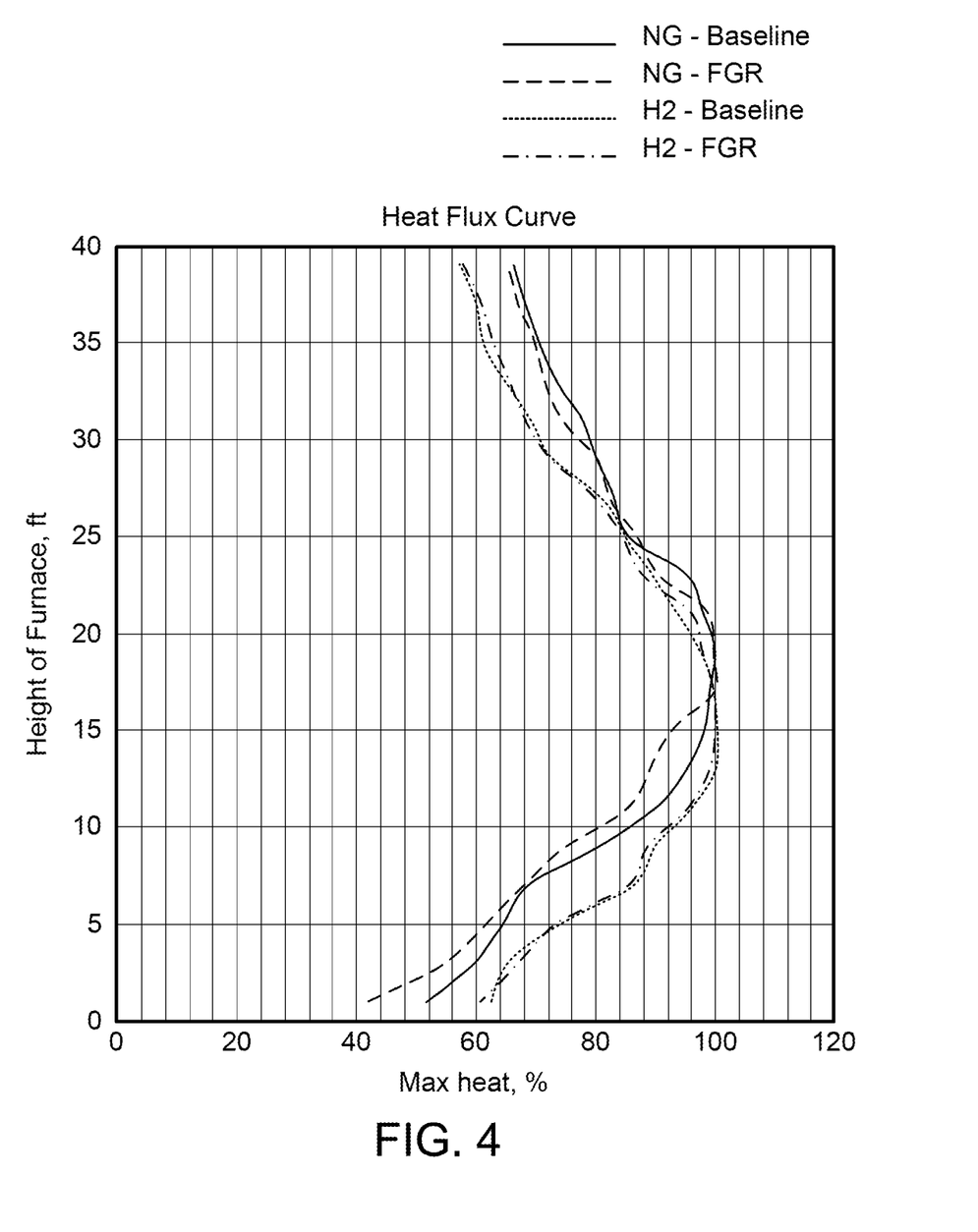
FIG. 4 is a graph showing heat profiles of a tube based on a fuel type.

As shown in FIG. 4, the heat flux curve is not significantly altered when the burners 16 are operated with or without flue gas. This means that the furnace radiant efficiency is constant regardless of the presence or absence of recirculated flue gas, whether that flue gas is drawn from the combustion zone 110 or from after the convection section 108.

Second, when the heat flux curve, the elevation of the peak heat flux on the process tubes 29, is affected by the substitution of hydrogen and hydrocarbon fuel. This mean that when running on hydrogen fuel, a certain portion of the process tube 29 may coke up and then when switching to a hydrocarbon fuel, a different location on the tubes 29 may tend to coke up sooner. When the coking becomes significant great, the tube metal temperature limit and/or the in-tube process fluid flow pressure drop through the coil may become too great, reach their limits. At that time, de-coking cycle is initiated, taking the furnace out of service for a period of time (six to 24 hours). By switching from either hydrogen or hydrocarbon fuel to the other fuel, the location of increased rate coking in the process tubes 29 is moved, shifted in elevation and different location in the tubes 29 can coke up at a higher rate, thereby extending the run-time of the furnace before needing de-coke.

Accordingly, the present disclosure also provides processes which include a first fuel 14 and combustion air 18 being passed to a burner 16 in a furnace 12, 20, 100, 100a, 100b, 100c, 100d, 100e and producing a flame from the combustion of the first fuel. A process fluid 26, 28 in process tubes 29 within the furnace 12, 20, 100, 100a, 100b, 100c, 100d, 100e is heated.

The process includes determining a level of coke on the process tubes 29 and when the determined level of coke meets or exceeds a threshold, a second fuel 22 is passed to the burner in the furnace. With the second fuel 14, and combustion air 18, a flame is produced and used to heat the process fluid 26, 28 in the process tubes 29 within the furnace 12, 20, 100, 100a, 100b, 100c, 100d, 100e.

As with the other aspects and embodiments, one of the first fuel 14 and the second fuel 22 comprises a hydrogen stream, and the other of the first fuel 14 and the second fuel 22 comprises a hydrocarbon stream.

Determining a level of coke on the process tubes 29 may include developing and or utilizing a look up table, either manually or via a controller/computer. The look up table may store time and other data to estimate coke levels based on historical data. Determining a level of coke on the process tubes 29 may also include measuring a pressure drop in the process tubes 29. Determining a level of coke on the process tubes 29 may include obtaining a tube/metal temperature.

One further benefit that is provided by the present process is the ability to effectively and efficiently use bio-based feed stocks alone or in connection with fossil fuel based feed stocks to generate carbon credits. In particular, with the present invention, when hydrocarbon fuels are used, the flue gas will pass through a carbon capture process zone 34 to remove carbon compounds. When the hydrocarbon fuel includes a least a portion of a bio-based feedstock, those carbons attributable to the bio-based fuel that are removed by the carbon capture process zone will result in a carbon credit. Accordingly, these credits can be sold, transferred, used, or otherwise disposed of. Further, it is contemplated that blockchain technology is utilized to provide for transparent and transferable carbon credits.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

EXAMPLE

As an example, there may be an array of ten (10) steam cracking furnaces in a single steam cracking process unit train that are currently running in a conventional non-carbon capture mode. Assuming, that the conventional hydrocarbon feedstock to the steam cracking process unit train produces a fuel gas for the cracking furnaces that is 30% by volume methane and 70% by volume hydrogen. It may be desired to have zero carbon emissions from the furnaces with minimal modification to the existing furnaces and lowest capital cost. It would likely be known that these furnaces were designed to achieve full process capacity on 100% methane fuel without carbon capture, as may often be the case. It can be calculated that with the 30% vol methane/70% vol hydrogen fuel, about 60% of the heat liberation would come from the methane and 40% from the hydrogen (based on a 910 btu/SCF lhv heating value for methane and a 274 btu/SCF lhv for hydrogen).

One could use post-combustion carbon capture such as ASCC on all ten furnaces. But it is known that the ASCC works more efficiently if the concentration of $CO_2$ being removed is higher. Further, the ASCC can be made a smaller size if less flue gas, flue gas from fewer furnaces goes to the ASCC. And since the methane and hydrogen are separated at the source, in the steam cracker downstream processing units, the fuel gases can be directed to different furnaces. For example, six (6) of the furnaces could run on 100% methane and four (4) of the furnaces could run on 100% hydrogen.

To achieve low NOx emissions may require the six (6) methane burners to receive flue gas from the combustion chamber, while the four (4) hydrogen-fired furnaces would receive flue gas from the stack. The flue gas recirculated from the stack may be more than is required to achieve low NOx from the hydrogen burners, but enough to make up the lost mass flow from switching these to hydrogen firing. Sizing and ASCC system for six (6), rather than ten (10) furnaces results in a smaller design and capacity and more efficient ASCC unit than if all ten (10) furnaces were to have ASCC applied, thereby reducing CAPEX and OPEX while achieving carbon capture of the entire fuel gas stream, albeit post combustion.

Further, ducting from each furnace stack can be directed to the ASCC unit. At any time, one or more of the cracking furnaces may be down for steam-air decoking and it may be desirable to consume all the hydrogen fuel gas available in the furnaces. In these cases, the hydrogen and remaining methane can be directed to different furnaces in the train, but only if the flexible fuel, low NOx and variable flue gas ducting systems (stack and firebox) are available on every furnace. These as the furnaces come down for turnaround maintenance or de-coke, the remaining furnaces can be flexibly used to consume the hydrogen without over burdening the ASCC unit.

While this example is applied to steam cracking services, of balancing and flexibly changing the fuel gas composition and flue gas recirculation while achieving low NOx can be applied to any collection and arrangement of furnaces, heaters and boilers in a petrochemical complex. The post-combustion carbon capture unit may be sized for the maximum number and capacity of furnaces available for hydrocarbon firing at any given time and the remaining fired equipment is run on pure or nearly pure hydrogen.

In some embodiments, some heaters or boilers, especially those not requiring regular de-coke or maintenance between turnarounds may be dedicated to either 100% hydrogen firing with no post-combustion carbon capture while others are dedicated hydrocarbon firing units with post-combustion carbon capture processing zone.

If economically feasible sources of hydrogen become available, then less post-combustion carbon capture capacity is needed, thereby reducing the OPEX of a carbon capture system.

Specific Embodiments

While the following is described in conjunction with specific embodiments, it will be understood that this description is intended to illustrate and not limit the scope of the preceding description and the appended claims.

A first embodiment of the invention is a process for controlling emissions in a plant, the process comprising passing a first fuel to a first furnace, the first furnace having a burner configured to receive combustion air, inject the first fuel and the combustion air into the first furnace, and produce a flame and flue gas; heating a first fluid in the first furnace; passing a second fuel to a second furnace, the second furnace having a burner configured to receive combustion air, inject the second fuel and the combustion air into the second furnace, and produce a flame and flue gas; heating a second fluid in the second furnace; wherein one of the first fuel and the second fuel comprises a hydrogen stream, and wherein the other of the first fuel and the second fuel comprises a hydrocarbon stream, wherein the first and second fuels are segregated from each other. An embodiment of the invention is one, any or all of prior embodiments in this paragraph up through the first embodiment in this paragraph, wherein the first fuel and the second fuel are unblended relative to each other. An embodiment of the invention is one, any or all of prior embodiments in this paragraph up through the first embodiment in this paragraph, wherein the first fuel comprises the hydrocarbon stream, and wherein the process comprises removing carbon from flue gas from the first furnace in a carbon capture unit. An embodiment of the invention is one, any or all of prior embodiments in this paragraph up through the first embodiment in this paragraph, further comprising venting a flue gas from the second furnace to the atmosphere. An embodiment of the invention is one, any or all of prior embodiments in this paragraph up through the first embodiment in this paragraph, further comprising mixing the flue gas from the first furnace with the first fuel to produce the flame in the first furnace. An embodiment of the invention is one, any or all of prior embodiments in this paragraph up through the first embodiment in this paragraph, further comprising removing the flue gas from the first furnace above a convection section of the first furnace. An embodiment of the invention is one, any or all of prior embodiments in this paragraph up through the first embodiment in this paragraph, further comprising removing the flue gas from the first furnace from a combustion zone/chamber in the first furnace. An embodiment of the invention is one, any or all of prior embodiments in this paragraph up through the first embodiment in this paragraph, wherein at least one of the first fuel and the second fuel are produced at the plant. An embodiment of the invention is one, any or all of prior embodiments in this paragraph up through the first embodiment in this paragraph, wherein both the first fuel and the second fuel are produced at the plant. An embodiment of the invention is one, any or all of prior embodiments in this paragraph up through the first embodiment in this paragraph, wherein the first fuel is passed to the first furnace simultaneously with the second fuel being passed to the second furnace. An embodiment of the invention is one, any or all of prior embodiments in this paragraph up through the first embodiment in this paragraph, further comprising combining a second hydrocarbon stream with the one of the first fuel and the second fuel that is the hydrocarbon stream. An embodiment of the invention is one, any or all of prior embodiments in this paragraph up through the first embodiment in this paragraph, further comprising combining a second hydrogen stream with the one of the first fuel and the second fuel that is the hydrogen stream.

A second embodiment of the invention is a process for controlling emissions from a furnace in a plant, the furnace configured to receive a hydrogen fuel and a hydrocarbon fuel, to produce a flame and a flue gas, and to heat a process fluid in tubes extending within the furnace, the process comprising determining a fuel being passed to the furnace, wherein the fuel comprises either a hydrogen fuel or a hydrocarbon fuel; and, providing a first exhaust path for a flue gas from the furnace when the fuel has been determined to be hydrogen fuel; and, providing a second exhaust path for a flue gas from the furnace when the fuel has been determined to be hydrocarbon fuel, wherein the first exhaust path and the second exhaust path are different. An embodiment of the invention is one, any or all of prior embodiments in this paragraph up through the second embodiment in this paragraph, wherein providing the first exhaust path comprises changing an orientation of at least one means for controlling a gas flow in order to direct the flue gas to either the first exhaust path or the second exhaust path. An embodiment of the invention is one, any or all of prior embodiments in this paragraph up through the second embodiment in this paragraph, wherein the first exhaust path comprises a carbon capture process zone. An embodiment of the invention is one, any or all of prior embodiments in this paragraph up through the second embodiment in this paragraph, wherein the carbon capture process zone comprises a solvent carbon capture process zone. An embodiment of the invention is one, any or all of prior embodiments in this paragraph up through the second embodiment in this paragraph, wherein an SCR process zone is disposed in the second exhaust path between the furnace and the carbon capture process zone. An embodiment of the invention is one, any or all of prior embodiments in this paragraph up through the second embodiment in this paragraph, wherein the second exhaust path comprises an opening to the atmosphere. An embodiment of the invention is one, any or all of prior embodiments in this paragraph up through the second embodiment in this paragraph, wherein the first exhaust path does not include any carbon capture process zone between the furnace and the opening to the atmosphere. An embodiment of the invention is one, any or all of prior embodiments in this paragraph up through the second embodiment in this paragraph, wherein the first exhaust path includes an SCR process zone between the furnace and the opening to the atmosphere.

A third embodiment of the invention is an apparatus comprising a first furnace configured to receive a first fuel, the first furnace having a burner configured to inject the first fuel into the first furnace and produce a flame and a flue gas; and, a second furnace configured to receive a second fuel, the second furnace having a burner configured to inject the second fuel into the second furnace and produce a flame and a flue gas; wherein both of the first furnace and the second furnace are configured to receive a fluid to be heated; wherein one of the first fuel and the second fuel comprises a hydrogen stream, and wherein the other of the first fuel and the second fuel comprises a hydrocarbon stream, wherein the first and second fuels are segregated from each other. An embodiment of the invention is one, any or all of prior embodiments in this paragraph up through the third embodiment in this paragraph, wherein the hydrocarbon stream is produced at a plant and the hydrogen stream is produced at the plant. An embodiment of the invention is one, any or all of prior embodiments in this paragraph up through the third embodiment in this paragraph, further comprising a first exhaust path for the flue gas from the first furnace; and, a second exhaust path for the flue gas from the second furnace. An embodiment of the invention is one, any or all of prior embodiments in this paragraph up through the third embodiment in this paragraph, further comprising at least one means for controlling a gas flow configured to direct a flow of the flue gas from the first furnace. An embodiment of the invention is one, any or all of prior embodiments in this paragraph up through the third embodiment in this paragraph, further comprising a controller in communication with each means for controlling a gas flow, the controller configured to send a signal to selectively change an orientation of each means for controlling a gas flow. An embodiment of the invention is one, any or all of prior embodiments in this paragraph up through the third embodiment in this paragraph, further comprising a sensor in communication the controller and configured to obtain data to determine whether the first fuel is the hydrocarbon stream or the hydrogen stream, wherein the controller is further configured to send the signal to change the orientation of each for means controlling the gas flow based on determining whether the first fuel is the hydrocarbon stream or the hydrogen stream. An embodiment of the invention is one, any or all of prior embodiments in this paragraph up through the third embodiment in this paragraph, wherein the controller is configured to send a signal to a further means for controlling a gas flow to adjust a source of recirculated flue gas passed to the first furnace. An embodiment of the invention is one, any or all of prior embodiments in this paragraph up through the third embodiment in this paragraph, wherein both the first fuel and the second fuel are in selective fluid communication with the first furnace.

A fourth embodiment of the invention is a furnace comprising a first inlet configured to receive a first fuel, the first fuel comprising one of a hydrogen fuel and a hydrocarbon fuel; a second inlet configured to receive a second fuel, the second fuel comprising the other of the hydrogen fuel and the hydrocarbon fuel; a third inlet configured to receive combustion air; a burner configured to receive the combustion air, the first fuel, and the second fuel and inject the combustion air, the first fuel, and the second fuel into the furnace and provide a flame and a flue gas; a tube configured to contain process fluid to be heated in the furnace; a first exhaust path for the flue gas produced by in furnace, wherein the first exhaust path comprises a carbon capture process zone; a second exhaust path for the flue gas produced by in furnace; and, means for controlling a gas flow configured to change orientation so that when the first inlet is opened, only the first exhaust path is opened and when the second inlet is opened, only the second exhaust path is opened. An embodiment of the invention is one, any or all of prior embodiments in this paragraph up through the fourth embodiment in this paragraph further comprising a controller configured to send signals to adjust an orientation of the means for controlling a gas flow.

A fifth embodiment of the invention is a plurality of furnaces according to the fourth embodiment, wherein a first furnace has the first inlet opened and, at the same time, a second furnace has the second inlet opened.

A sixth embodiment of the invention is a process for controlling coke on tubes in a furnace, the furnace having a burner configured to receive a fuel and combustion air and produce a flame to process fluid within the tubes, the process comprising passing a first fuel and combustion air to a burner in a furnace; producing a flame from the combustion of the first fuel and heating a process fluid in process tubes within the furnace; determining a level of coke on the process tubes; when the determined level of coke meets or exceeds a threshold, passing a second fuel and combustion air to the burner in the furnace; and, producing a flame from the combustion of the second fuel and heating the process fluid in the process tubes within the furnace, wherein one of the first fuel and the second fuel comprises a hydrogen stream, and wherein the other of the first fuel and the second fuel comprises a hydrocarbon stream. An embodiment of the invention is one, any or all of prior embodiments in this paragraph up through the sixth embodiment in this paragraph, wherein determining a level of coke on the process tubes comprises utilizing a lookup table based on time and/or historical data; or, measuring or obtaining a pressure drop associated with the process tubes; or, measuring or obtaining a temperature associated with the process tubes; or, a combination thereof.

A seventh embodiment of the invention is a process for generating carbon credits, the process comprising passing a first fuel to a first furnace, the first furnace having a burner configured to receive combustion air, inject the first fuel and the combustion air into the first furnace, and produce a flame and flue gas, wherein the first fuel comprises a hydrocarbon stream, wherein at least a portion of the hydrocarbon stream comprises hydrocarbons produced from a biobased feedstock; heating a first fluid in the first furnace; passing a second fuel to a second furnace, the second furnace having a burner configured to receive combustion air, inject the second fuel and the combustion air into the second furnace, and produce a flame and flue gas, wherein the second fuel comprises a hydrogen stream; heating a second fluid in the second furnace; recovering carbon compounds from the flue gas from the first furnace; and, determining an amount of carbon compounds attributable to the hydrocarbons produced from a biobased feedstock so as to generate a carbon credit. An embodiment of the invention is one, any or all of prior embodiments in this paragraph up through the seventh embodiment in this paragraph, further comprising transferring the carbon credit. An embodiment of the invention is one, any or all of prior embodiments in this paragraph up through the seventh embodiment in this paragraph, wherein the carbon credit is transferred using blockchain encryption.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An apparatus comprising:
a first furnace configured to receive a first fuel, the first furnace having a burner configured to inject the first fuel into the first furnace and produce a flame and a flue gas; and,
a second furnace configured to receive a second fuel, the second furnace having a burner configured to inject the second fuel into the second furnace and produce a flame and a flue gas;

wherein both of the first furnace and the second furnace are configured to receive a fluid to be heated;

wherein one of the first fuel and the second fuel comprises a hydrogen stream, and wherein the other of the first fuel and the second fuel comprises a hydrocarbon stream, wherein the first and second fuels are segregated from each other.

2. The apparatus of claim 1, wherein the hydrocarbon stream is produced at a plant and the hydrogen stream is produced at the plant.

3. The apparatus of claim 1, further comprising:
a first exhaust path for the flue gas from the first furnace; and,
a second exhaust path for the flue gas from the second furnace.

4. The apparatus of claim 3, further comprising: at least one means for controlling a gas flow configured to direct a flow of the flue gas from the first furnace.

5. The apparatus of claim 4, further comprising:
a controller in communication with each of the at least one means for controlling a gas flow, the controller configured to send a signal to selectively change an orientation of each of the at least one means for controlling a gas flow.

6. The apparatus of claim 5, further comprising:
a sensor in communication the controller and configured to obtain data to determine whether the first fuel is the hydrocarbon stream or the hydrogen stream,
wherein the controller is further configured to send the signal to change the orientation of each of the at least one means for controlling a gas flow based on determining whether the first fuel is the hydrocarbon stream or the hydrogen stream.

7. The apparatus of claim 5, wherein the controller is configured to send a signal to a further means for controlling a gas flow to adjust a source of recirculated flue gas passed to the first furnace.

8. The apparatus of claim 3, wherein both the first fuel and the second fuel are in selective fluid communication with the first furnace.

9. A furnace comprising:
a first inlet configured to receive a first fuel, the first fuel comprising one of a hydrogen fuel and a hydrocarbon fuel;
a second inlet configured to receive a second fuel, the second fuel comprising the other of the hydrogen fuel and the hydrocarbon fuel;
a third inlet configured to receive combustion air;
a burner configured to receive the combustion air, the first fuel, and the second fuel and inject the combustion air, the first fuel, and the second fuel into the furnace and provide a flame and a flue gas;
a tube configured to contain process fluid to be heated in the furnace;
a first exhaust path for the flue gas produced by in furnace, wherein the first exhaust path comprises a carbon capture process zone;
a second exhaust path for the flue gas produced by in furnace; and,
means for controlling a gas flow configured to change orientation so that when the first inlet is opened, only the first exhaust path is opened and when the second inlet is opened, only the second exhaust path is opened.

10. The furnace of claim 9 further comprising:
a controller configured to send signals to adjust the orientation of the means for controlling a gas flow.

11. A plurality of furnaces, wherein each of the plurality of furnaces is the furnace according to claim 9; wherein a first furnace of the plurality of furnaces has the first inlet opened and, at the same time, a second furnace of the plurality of furnaces has the second inlet opened.

12. A process for generating carbon credits, the process comprising:
passing a first fuel to a first furnace, the first furnace having a burner configured to receive combustion air, inject the first fuel and the combustion air into the first furnace, and produce a flame and flue gas, wherein the first fuel comprises a hydrocarbon stream, wherein at least a portion of the hydrocarbon stream comprises hydrocarbons produced from a biobased feedstock;
heating a first fluid in the first furnace;
passing a second fuel to a second furnace, the second furnace having a burner configured to receive combustion air, inject the second fuel and the combustion air into the second furnace, and produce a flame and flue gas, wherein the second fuel comprises a hydrogen stream;
heating a second fluid in the second furnace;
recovering carbon compounds from the flue gas from the first furnace; and,
determining an amount of carbon compounds attributable to the hydrocarbons produced from the biobased feedstock so as to generate a carbon credit.

13. The process of claim 12, further comprising:
transferring the carbon credit.

14. The process of claim 13, wherein the carbon credit is transferred using blockchain encryption.

* * * * *